Dec. 11, 1956 A. A. MEYERHOFF 2,774,040

PHASE MODULATION SYSTEMS

Filed Aug. 28, 1953

INVENTOR.
ALAN A. MEYERHOFF

BY Harry M. Saragovitz

ATTORNEY

United States Patent Office 2,774,040

Patented Dec. 11, 1956

2,774,040

PHASE MODULATION SYSTEMS

Alan A. Meyerhoff, New Brunswick, N. J., assignor to the United States of America as represented by the Secretary of the Army Application August 28, 1953, Serial No. 377,269

4 Claims. (Cl. 332—16)

(Granted under Title 35, U. S. Code (1952), sec. 266)

This application is a continuation in part of application Serial No. 287,797, entitled "Phase Modulation Circuit," which was filed May 14, 1952, now abandoned.

The invention described herein may be manufactured and used by the Government for governmental purposes without the payment of any royalty thereon.

The present invention relates to phase modulation systems. More particularly, it relates to an improved phase modulation system of the type which comprises an amplifier including an electron discharge device having a control electrode and having a load with a reactive component, and wherein a relatively low amplitude carrier frequency wave and a relatively high amplitude modulating signal are applied as an input to the electron discharge device. Since the amplifier has a load with a reactive component, the input will not only be amplified, but the output of the amplifier will be phase shifted relative to the input. Moreover, both the amplification and the phase shift of the amplifier will be a function of the transconductance of the electron discharge device. Since the modulating signal has a relatively high amplitude, the transconductance of the electron discharge device will vary in accordance therewith. Thus, the output of the amplifier will consist of a wave having a wanted phase modulation and an unwanted amplitude modulation.

Heretofore it was necessary to restrict the operating range of the phase modulation system, of the type hereinabove described, in order to keep the unwanted modulation within tolerable limits. This necessitated an inordinate frequency multiplication of the output of the phase modulation system to attain the required phase deviation.

It is therefore an object of this invention to provide an improved phase modulation system, of the type hereinabove described, wherein unwanted amplitude modulation is substantially eliminated.

A further object of this invention is to provide an improved phase modulation system having increased phase deviation sensitivity.

These objects are accomplished by using a constant current carrier frequency source, and by providing a load having a total impedance which is small relative to the plate resistance of the electron discharge device, and is substantially equal to the capacitive reactance existing between the control electrode and anode of the electron discharge device.

The features of the invention, which are believed to be novel, are set forth with particularity in the appended claims. The invention itself, however, both as to its organization and method of operation, together with further advantages thereto may best be understood by reference to the following description taken in conjunction with the accompanying drawing, wherein:

Figure 1:
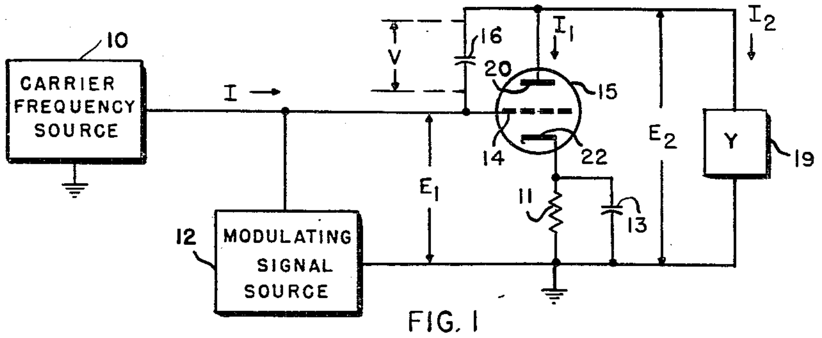
Fig. 1 shows a generalized circuit illustrating the principles of the invention.

Referring now to Fig. 1, carrier frequency source 10 and modulating signal source 12 are connected between control electrode 14 of electron discharge device 15 and a point of reference potential. Load 19, having an admittance Y, is connected between anode 20 of electron discharge device 15 and the point of reference potential. Resistance 11, which is bypassed at the carrier frequency by capacitance 13, is connected between cathode 22 of electron discharge device 15 and the point of reference potential.

Capacitance 16 is the capacitance existing between control electrode 14 and anode 20 of electron discharge device 15. Capacitance 16 may consist only of the interelectrode capacitance and distributed capacitance between control electrode 14 and anode 20, or it may include a lumped capacitance as well as the interelectrode and distributed capacitance.

In order to more fully understand the present invention, the voltage and current relationships in the circuit shown in Fig. 1 will now be considered.

In the following equations, C is the magnitude of capacitance 16, Y is the admittance of load 19, $E_1$ is the peak amplitude of the carrier frequency wave, $\omega$ is the angular velocity of the carrier frequency, I is the current through capacitance 16, V is the peak amplitude of the voltage across capacitance 16, $E_2$ is the peak amplitude of the output voltage, $I_1$ is the anode-cathode current through electron discharge device 15, $I_2$ is the current through load 19, $g_m$ is the transconductance of electron discharge device 15, and $j$ is the square roof of $-1$.

It will be seen that:

(1) $$I = j\omega CV$$

However, (2) $$V = E_1 - E_2$$

Therefore, (3) $$I = j\omega CE_1 - j\omega CE_2$$

Further, (4) $$I_1 = g_m E_1$$

(5) $$I_2 = YE_2$$

In accordance with Kirchhoff's law, (6) $$I_1 + I_2 - I = 0$$

Substituting, (7) $$(g_m - j\omega C)E_1 + (j\omega C + Y)E_2 = 0$$

Prior to the present invention, the carrier frequency source which was employed was substantially a constant voltage source. Then from Equation 7, (8) $$\frac{E_2}{E_1} = -\frac{g_m - j\omega C}{j\omega C + Y}$$

The absolute magnitude of the output is, (9) $$\left|\frac{E_2}{E_1}\right| = \frac{\sqrt{g_m^2 + (\omega C)^2}}{-(j\omega C + Y)}$$

and the phase is,

(10) $$\phi = -\arctan\left(\frac{\omega C}{g_m}\right)$$

The quantity $g_m$ varies in accordance with the instantaneous amplitude of the modulating signal. It will be seen from Equation 9 that $g_m$ appears only in the numerator. Therefore, for a constant voltage carrier frequency source, there will be a wanted phase modulation in accordance with Equation 10 and an unwanted amplitude modulation in accordance with Equation 9. In accordance with the present invention, a constant current carrier frequency source is employed. It is therefore necessary to obtain the ratio of $$\frac{E_2}{I}$$

Solving Equation 3 for $E_1$, we obtain, $$\frac{I+j\omega CE_2}{j\omega C}=E_1 \tag{11}$$

Substituting this value for $E_1$ in Equation 7, $$0=(g_m-j\omega C)\left(\frac{I+j\omega CE_2}{j\omega C}\right)+(j\omega C+Y)E_2 \tag{12}$$

Clearing fractions, $$0=(g_m-j\omega C)I+j\omega C(g_m-j\omega C)E_2+j\omega C(j\omega C+Y)E_2 \tag{13}$$

Simplifying, $$0=(g_m-j\omega C)I+j\omega C(g_m+Y)E_2 \tag{14}$$

Therefore, $$\frac{E_2}{I}=-\frac{1}{j\omega C}\left[\frac{g_m-j\omega C}{g_m+Y}\right] \tag{15}$$

In accordance with the present invention, the admittance Y of the load is made equal to the susceptance of capacitance 16, that is, substituting $j\omega C$ in Equation 15, we obtain, $$\frac{E_2}{I}=-\frac{1}{j\omega C}\left[\frac{g_m-j\omega C}{g_m+j\omega C}\right] \tag{16}$$

Rationalizing the denominator, $$\frac{E_2}{I}=-\frac{1}{j\omega C}\left[\frac{g_m-j\omega C}{g_m+j\omega C}\right]\left[\frac{g_m-j\omega C}{g_m-j\omega C}\right] \tag{17}$$

Simplifying, $$\frac{E_2}{I}=-\frac{1}{j\omega C}\left[\frac{[g_m^2-(\omega C)^2]+j[-2g_m\omega C]}{g_m^2+(\omega C)^2}\right] \tag{18}$$

The absolute magnitude of the output is, $$\left|\frac{E_2}{I}\right|=-\frac{1}{j\omega C}\left[\frac{\sqrt{[g_m^2-(\omega C)^2]^2+4g_m^2(\omega C)^2}}{g_m^2+(\omega C)^2}\right] \tag{19}$$

Simplifying, $$\left|\frac{E_2}{I}\right|=-\frac{1}{j\omega C}\left[\frac{\sqrt{g_m^4-2g_m^2(\omega C)^2+(\omega C)^4+4g_m^2(\omega C)^2}}{g_m^2+(\omega C)^2}\right] \tag{20}$$

$$\left|\frac{E_2}{I}\right|=-\frac{1}{j\omega C}\left[\frac{\sqrt{g_m^4+2g_m^2(\omega C)^2+(\omega C)^4}}{g_m^2+(\omega C)^2}\right] \tag{21}$$

$$\left|\frac{E_2}{I}\right|=-\frac{1}{j\omega C}\left[\frac{g_m^2+(\omega C)^2}{g_m^2+(\omega C)^2}\right] \tag{22}$$

Thus, $$\left|\frac{E_2}{I}\right|=-\frac{1}{j\omega C} \tag{23}$$

Therefore, under the stated conditions there will be no amplitude modulation at all, since Equation 23 does not include the term $g_m$.

From Equation 18, the phase modulation is, $$\operatorname{Tan}\phi=-\frac{2g_m\omega C}{g_m^2-(\omega C)^2} \tag{24}$$

dividing numerator and denominator by $g_m^2$, $$\operatorname{Tan}\phi=-\frac{\dfrac{2\omega C}{g_m}}{1-\left(\dfrac{\omega C}{g_m}\right)^2} \tag{25}$$

However, from trigonometry, $$\operatorname{Tan} 2x=\frac{2\tan x}{1-\tan^2 x} \tag{26}$$

Thus, $$\operatorname{Tan}\frac{\phi}{2}=-\frac{\omega C}{g_m} \tag{27}$$

So that, $$\phi=-2\arctan\left(\frac{\omega C}{g_m}\right) \tag{28}$$

Comparing Equation 23 with Equation 9 and Equation 28 with Equation 10, it will be seen that by using a constant current carrier frequency wave source, and by providing a load having an admittance Y equal to $j\omega$C, the unwanted amplitude modulation is eliminated and the phase deviation sensitivity is doubled.

Figure 2:
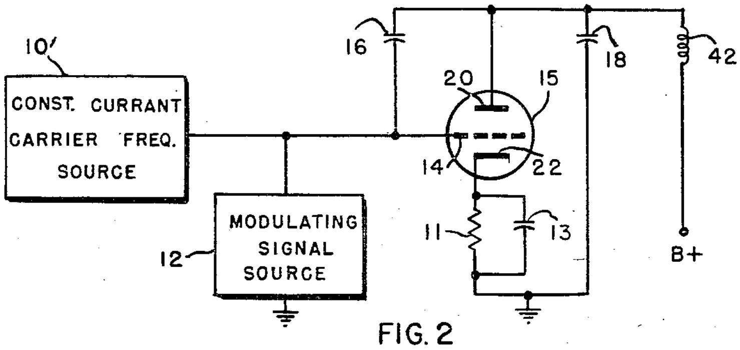
Fig. 2 shows a schematic circuit of the invention.

Referring now to Fig. 2, which is a preferred embodiment of the invention. Fig. 2 is a special case of the generalized circuit of Fig. 1. Like parts in Figs. 1 and 2 are identified by like reference numerals. Carrier frequency source 10 of Fig. 1 has been replaced in Fig. 2 by constant carrier frequency source 10'. Load 19 of Fig. 1 is, in Fig. 2, made up of capacitance 18 connected between anode 20 and the point of reference potential and radio frequency choke 42 connected between anode 20 and a point of positive potential.

Capacitance 18 is equal in magnitude to capacitance 16. Furthermore, the reactance of capacitance 18 at the carrier frequency is small relative to both the plate resistance of electron discharge device 15 and to the reactance of radio frequency choke 42 at the carrier frequency. Thus, the load admittance is substantially equal to $j\omega$C. Therefore, Equations 23 and 28 apply to the circuit shown in Fig. 2.

In a phase modulation system which was actually constructed and tested, constant current frequency source 10' had a frequency of 800 kilocycles, electron discharge device 15 was one-half of a 6SL7, capacitances 16 and 18 were each 50 micromicrofarads, radio frequency choke 42 was 5 millihenrys, resistance 11 was 25,000 ohms, and capacitance 13 was 68 micromicrofarads.

Figure 3:
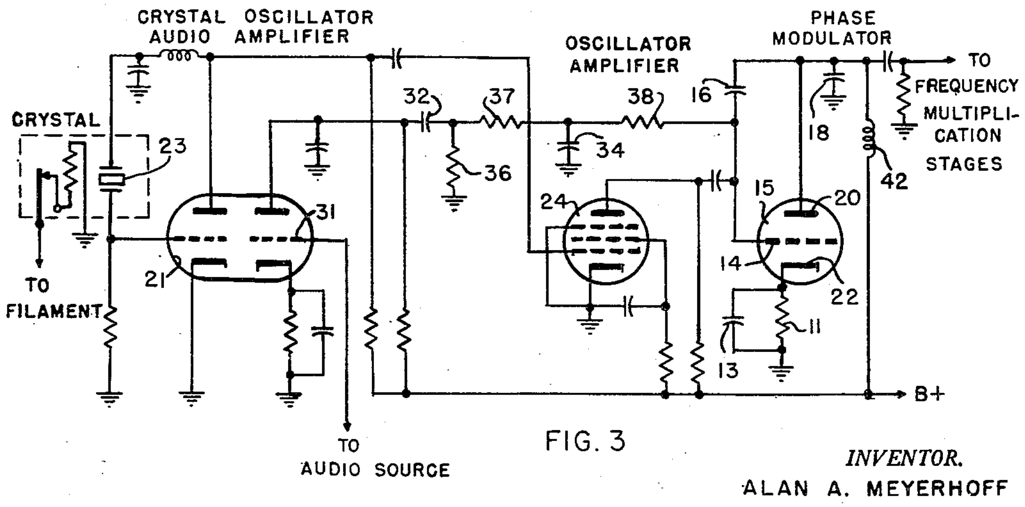
Fig. 3 shows a more detailed schematic circuit of a preferred embodiment of the invention.

Referring now to Fig. 3, which shows in detail the circuit of constant carrier frequency source 10' and modulating signal source 12 in addition to the phase modulator, like elements having like reference numerals. The constant current carrier frequency source is derived from a crystal oscillator which consists of frequency determining crystal 23 and the left half of dual triode 21 together with the necessary circuit elements. The output of the oscillator is applied to the control grid of pentode 24, which is connected to impress a constant current carrier frequency wave upon control electrode 14 of electron discharge device 20.

Modulating signal source 12 comprises an audio amplifier (the right half of dual triode 21) to which is applied an audio source. The audio output of the audio amplifier is passed through an audio de-emphasis circuit consisting of capacitors 32 and 34, and resistors 36, 37 and 38, to control electrode 14 of electron discharge device 20.

It will be seen, therefore, that applicant has provided a phase modulation system wherein unwanted amplitude modulation is eliminated and wherein phase deviation sensitivity is doubled.

Wherever the term "phase modulation" is used throughout the specification and claims, it should be understood to refer to any modulation wherein the instantaneous phase of the output waves is varied by the application of a modulating voltage of an alternating character, such as music or speech. There are many possible functional relations between the instantaneous wave phase and the modulating voltage which are or can be used. For example, if the instantaneous phase is caused to shift in direct proportion to the instantaneous value of the modulating voltage, there results one common form of phase modulation, or if the instantaneous frequency is caused to vary as the time differential of the modulating voltage there results a type of phase variation, which is usually called frequency modulation because it is with equal correctness and somewhat more simply definable as a modulation which causes the frequency of the output waves to shift in direct proportion to the instantaneous value of the modulating voltage. In other words, the terms "phase modulation" and "frequency modulation" are tied together by the fact that a changing phase necessitates a changing frequency and vice versa. Furthermore, in many practical systems going under the name of "phase modulation," the instantaneous phase does not vary directly as the voltage of the modulating voltage, nor yet as its differential, but in some intermediate fashion. Regardless of the exact nature of the functional relation mentioned above, the system of the present invention can be employed and hence such terms as "phase modulation," "frequency modulation," and the like, should be taken in the broad sense here defined.

While there has been described what is at present considered the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A phase modulation system comprising a carrier frequency wave source of constant frequency and constant current, a source of modulating signal, an electron discharge device having a cathode, anode and control electrode, the transconductance of said electron discharge device being a function of the potential difference existing between said control electrode and cathode, means applying said carrier frequency wave and said modulating signal between said control electrode and cathode, a capacitance having a given reactance at said carrier frequency coupling said control electrode to said anode, said given reactance being appreciably smaller than the plate resistance of said electron discharge device, and a load having a total impedance substantially equal to said given reactance connected between said anode and cathode, whereby a phase modulated output is obtained across said load.

2. A phase modulation system as set forth in claim 1, wherein said carrier frequency wave source comprises a crystal oscillator and a pentode amplifier having its input coupled to the output of said crystal oscillator, whereby said carrier frequency wave is obtained across the output of said pentode amplifier.

3. A phase modulation system as set forth in claim 1, further including means connecting said cathode to a point of reference potential, and wherein said load comprises a radio frequency choke connected between said anode and a point of positive potential relative to said point of reference potential, and a second capacitance equal in magnitude to said first-mentioned capacitance connected between said anode and said point of reference potential, the reactance of said radio frequency choke at said carrier frequency being many times said given reactance, whereby the total impedance of said load to said phase-modulated output is effectively determined by said second capacitance and is substantially equal to said given reactance.

4. A phase modulation system as set forth in claim 3, wherein said carrier frequency wave and said modulating potential are applied between said control electrode and said point of reference potential, and said means connecting said cathode to said point of reference potential comprises a resistance and a third capacitance bypassing said resistance for providing a bias voltage between said cathode and control electrode.

References Cited in the file of this patent

UNITED STATES PATENTS

| | | |
|---|---|---|
| 2,310,260 | Schock | Feb. 9, 1943 |
| 2,443,746 | Peterson | June 22, 1948 |
| 2,614,247 | Boisvieux | Oct. 14, 1952 |

OTHER REFERENCES

QST, for January 1947, pp. 11 to 15.